UNITED STATES PATENT OFFICE.

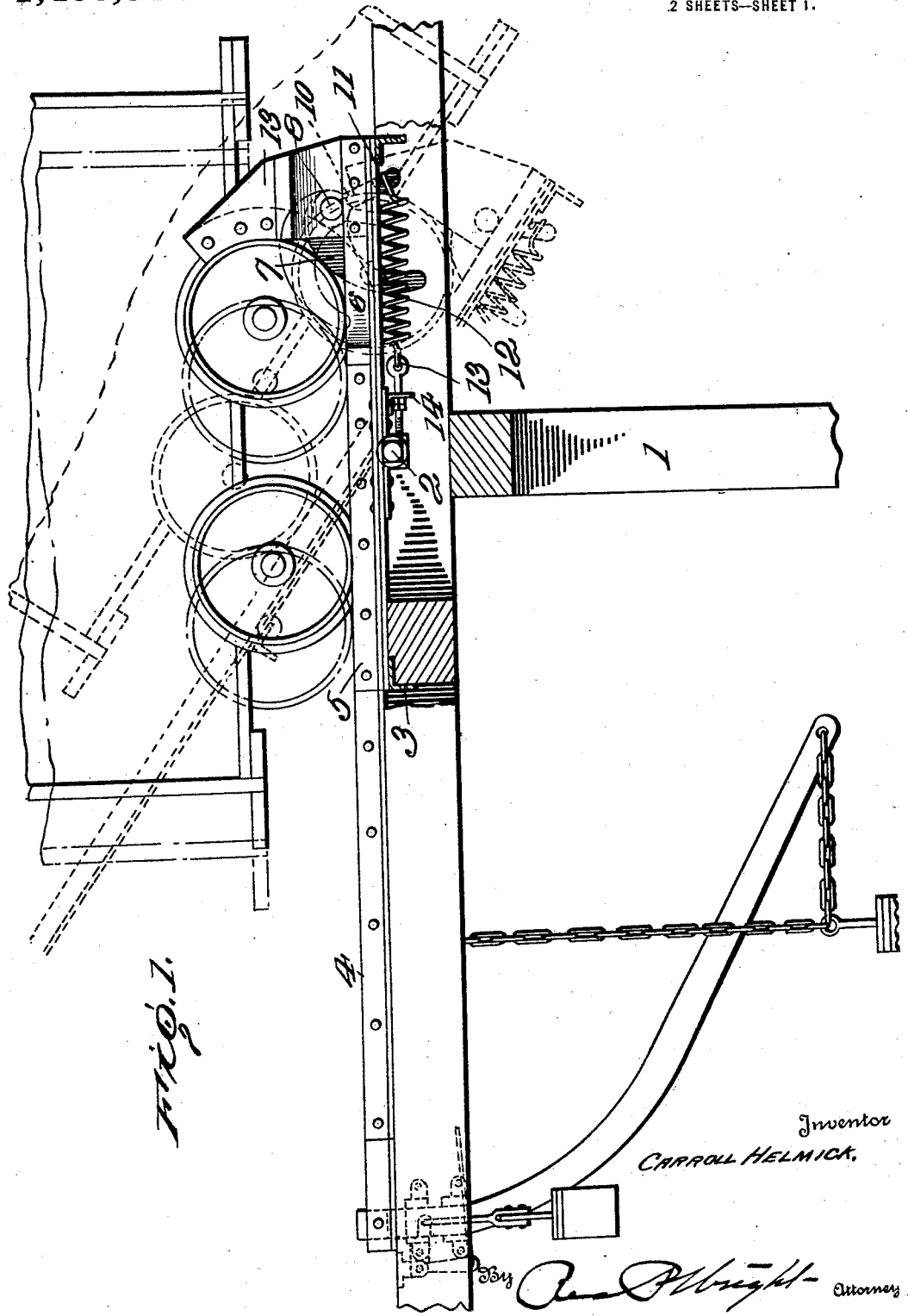

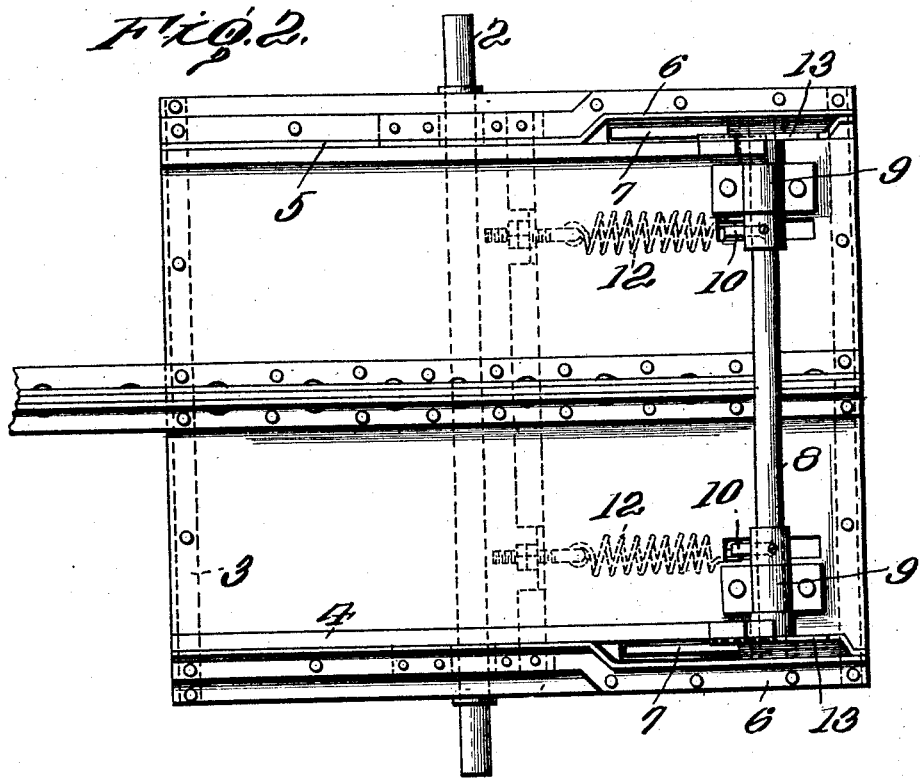
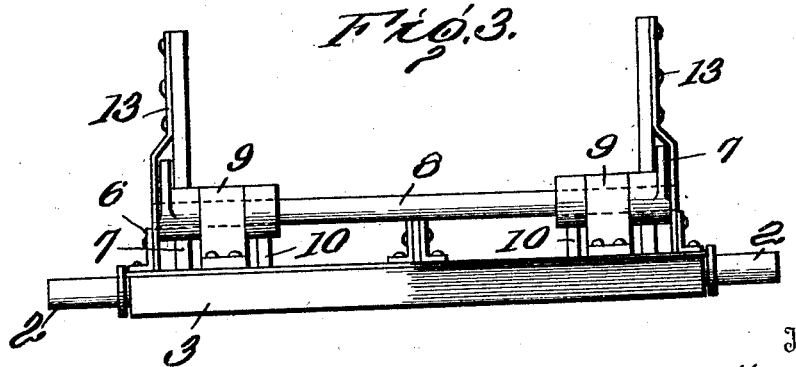

CARROLL HELMICK, OF FAIRMONT, WEST VIRGINIA.

CAR TIP AND DUMPING APPARATUS.

1,408,941.   Specification of Letters Patent.   Patented Mar. 7, 1922.

Application filed June 16, 1919. Serial No. 304,398.

*To all whom it may concern:*

Be it known that I, CARROLL HELMICK, a citizen of the United States, residing at Fairmont, in the county of Marion and State of West Virginia, have invented certain new and useful Improvements in a Car Tip and Dumping Apparatus, of which the following is a specification, reference being had therein to the accompanying drawing.

This invention relates to certain new and useful improvements in a car tip and dumping apparatus, the object being to provide a car dumping apparatus in which means are provided for retarding the movement of the car passing upon the tilting platform, which means imparts to the car a movement after the car has been dumped which has the tendency to roll the car back off the platform.

Another and further object of the invention is to provide a car dumping apparatus in which a pair of arc levers are mounted in the path of travel of the car wheel in passing upon the tilting platform, said levers having a connection with springs whereby the tension of the spring will return the levers to their normal position, the movement of the levers forcing the car wheels upwardly so that rolling motion will be imparted thereto.

A still further object of the invention is to provide a car dumping apparatus which is exceedingly simple and cheap in construction, the tilting platform carrying the retarding means and having horns for stopping the car in the proper position whereby the coal will be dumped from the car and the tilting platform and car returned to horizontal position.

Other and further objects and advantages of the invention will be hereinafter set forth and the novel features thereof defined by the appended claims.

In the drawings,

Figure 1 is a vertical section through the dumping apparatus constructed in accordance with my invention showing a car in position thereon in full lines; in dotted lines in position to dump the load, and in dotted and dash line in a position the car assumes when acted upon by the retarding means.

Figure 2 is a top plan view of the tilting platform showing the application of my invention, and Figure 3 is an end elevation of the tilting platform.

In the drawing 1 indicates a suitable support provided with bearings in which is mounted a shaft 2 carrying a platform 3 which is provided with a brake tongue 4 having the usual sword and brake, as clearly shown.

The platform 3 is provided with rails 5 which are offset as shown at 6 in which are mounted arc levers 7 carried by a rock shaft 8 mounted in suitable bearings 9, said levers being formed on the arc of a circle of the same diameter as the wheels of the car or of proportional ratio to each other. Fixed on the rock shaft 8 are arms 10 having notches 11 to receive the loops of coils springs 12 which are carried by eye-bolts 13 adjustably mounted in L-beams 14 fixed to the underside of the tilting platform or frame, as clearly shown in Figs. 1 and 2. The tilting platform is provided with horns 13 which are adapted to be engaged by the car wheel so as to stop the car in the proper position on the tilting platform whereby the tilting platform when released will move into position as shown in Fig. 1 so as to dump the contents of the car. After the contents of the car has been dumped the tilting platform automatically returns to its original position.

As the car rolls onto the tilting platform the car wheels are brought into engagement with the arc levers 7 which are arranged in advance of the horns and in the path of travel of the tread of the car wheels and as these arc levers are held in raised position by the action of the spring the movement of the car is retarded by the levers, which levers are depressed by the weight of the car into the position shown in dotted lines. The weight of the car holds these levers in depressed position until the load has been dumped, and the tilting platform returned to a horizontal position. The springs then are of sufficient strength to cause the shaft 8 to be rocked which moves the levers upwardly, and as they are in contact with the tread of the wheel and below the horizontal center line of the wheels the car is slightly lifted, and at the same time the levers have the tendency to roll the wheels back as the point of the fulcrum of the levers and the point from which the radius of the face of the arc levers are inscribed are forward and below the horizontal center line of the wheel centers, the car is rolled back off the platform.

From the foregoing description it will be seen that I have provided a car dumping apparatus in which a tilting platform having a pair of pivoted arc levers arranged in the path of travel of the wheels of the car in its movement onto the platform in order to provide means for retarding the movement of the car before it reaches the horns which movement by the impact depresses the levers against the tension of the springs so that when the load has been removed from the car and the tilting platform returned to its original position the levers which have been placed under tension by the springs will return to their original positions. The levers in their movement of returning to the original position imparts a lifting and rolling movement to the car so as to roll the car off the platform.

While I have shown and described my invention applied to a tilting platform it is of course understood that the same can be used for employing a rolling movement to a car, and I do not wish to limit myself to the details of construction herein shown as my invention consists broadly in providing means for retarding the movement of a rolling body, which means is placed under tension by the rolling body when loaded so that when the rolling body is relieved of its weight it will return to a horizontal position, said means will have the tendency to lift and roll the body.

What I claim as new is:

1. A car dumping apparatus having a tilting platform provided with means for retarding the movement of a car passing thereon, said retarding means having a rolling contact with the wheel of the car imparting a vertical rearward movement to the car after the load has been dumped therefrom.

2. A car dumping apparatus comprising a tilting platform having means for retarding and stopping a car in its movement thereon, said retarding means having a rolling contact with the wheel of the car and placed under tension by the movement of the car whereby when released will first lift and then roll the car off said platform.

3. A car dumping apparatus comprising a tilting platform having means for retarding the movement of a car in its passage thereon having a rolling contact with the wheel of the car, said means imparting a force to the car when relieved of its load for lifting and rolling the car off said platform.

4. A car dumping apparatus comprising a pivoted platform upon which a car is adapted to be rolled to be dumped, means carried by said platform for retarding the movement of said car in its passage thereon, said retarding means having a rolling contact with the wheel of the car and acting against the wheels of the car when the car is relieved of its load for lifting and rolling said car off said platform.

5. A car dumping apparatus comprising a tilting platform having rails provided with offset portions, pivoted arc levers working in said offset portion in the path of travel of the tread of the wheels of a car of proportional ratio to each other, a rock shaft upon which said levers are mounted, arms carried by said rock shaft, and springs connecting said arms to said platform.

6. A car dumping apparatus comprising a pivoted platform adapted to receive a car in horizontal position and to tilt to dump the load from said car and to return to a horizontal position automatically, said platform having retarding means having a rolling contact with the wheels of the car in the movement of the car thereon, said retarding means being formed on the arc of a circle of the same diameter as the car wheels acting on the wheels of the car when the load has been discharged therefrom for rolling said car off said platform.

7. A car dumping apparatus comprising a pivoted platform having a pair of rails, horns disposed at the end of said rails for stopping the car in its rolling movement thereon, said platform being capable of tilting to dump the load from said car and to automatically return to horizontal position, and means mounted on said platform having a rolling contact with the wheels of the car for retarding the movement of the loaded car and for imparting a lifting and rolling movement to the wheels of the car after the load has been removed therefrom.

8. A car dumping apparatus comprising a tilting platform having a pair of rails provided with offset portions at one end, horns disposed at the ends of said offset portions, a rock shaft mounted on said platform, arc levers fixed on said shaft working in the offset portions of said rails having a rolling contact with the tread of the car wheels in its passage thereon, arms carried by said rock shaft, an L-beam carried by said platform, springs connected to said arms, and eye-bolts carried by said springs adjustably mounted in said L-beam.

9. In a car dumping apparatus the combination with a tilting platform having means for retarding the tilting movement thereof and for returning the platform into horizontal position, spring actuated arc levers mounted on said platform in the path of travel of the wheels of the car in its passage thereon for retarding the movement of said car, said levers having a rolling contact with the wheel of the car and being placed under tension by the movement of the car whereby said levers will lift and roll the car off said platform when the load has been removed from the car.

10. A car dumping apparatus comprising a pivoted platform having a pair of rails and provided with a pair of levers arranged in the path of travel of a car rolling on said rail, and having a rolling contact with the wheel of the car, springs for holding said levers in raised position, said levers being placed under tension by the movement of the car on said platform and serving to lift and roll the car off the platform after the load has been discharged therefrom.

In testimony whereof I hereunto affix my signature in the presence of two witnesses.

CARROLL HELMICK.

Witnesses:
LOUIS G. HELMICK,
W. B. CROWL.